April 18, 1933.　　　R. SHIMIZU　　　1,903,945
ANODE FOR WATER COOLED VACUUM TUBES
Filed Dec. 27, 1929

INVENTOR
R. SHIMIZU
BY
Walter C. Kiesel
ATTORNEY

Patented Apr. 18, 1933

1,903,945

UNITED STATES PATENT OFFICE

RINJIRO SHIMIZU, OF TOKYO, JAPAN, ASSIGNOR TO WESTERN ELECTRIC COMPANY, INCORPORATED, OF NEW YORK, N. Y., A CORPORATION OF NEW YORK

ANODE FOR WATER-COOLED VACUUM TUBES

Application filed December 27, 1929, Serial No. 416,852, and in Japan January 24, 1929.

This invention relates to an improvement of the anode in a water-cooled vacuum tube especially a water-cooled vacuum tube giving an output of high power, and its object is to promote the cooling efficiency of such vacuum tubes.

Figure 1:
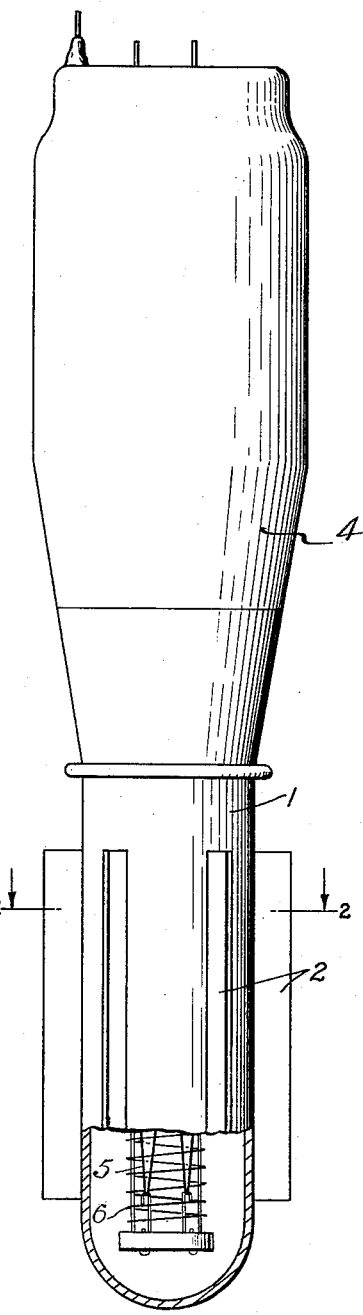
Fig. 1 is an elevational view of a water-cooled vacuum tube provided with an anode in accordance with this invention, with a portion of the anode broken away to show the interior electrodes of the tube.
Figure 2:
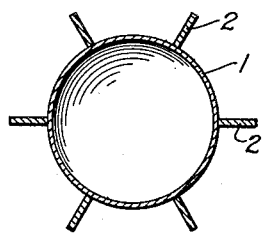
Fig. 2 is a cross-sectional view of the anode taken along the line 2—2 of Fig. 1.

In general, a vacuum tube of the water-cooled type has a metallic anode on the outside of the tube which is cooled by the water flowing along its outer surface. According to this invention a vacuum tube comprises an enclosed vessel including a glass portion 4 and a metallic cup-shaped anode 1 and the metallic anode 1 is provided with a plurality of vertical radial blades 2 on its surface as shown in Figs. 1 and 2. The radial blades fixed to the surface of the anode 1 by welding or any other suitable method, are composed of thin metallic plates having good heat conductivity. In these figures six blades are shown for an example, but the number may be selected suitably. The thickness, length and width of the blades may also be suitably varied. A cathode 5 and a grid 6 are mounted within the enclosing vessel in cooperative relation with the anode 1.

Figure 4:
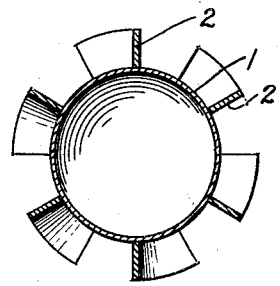
Fig. 4 is a cross-sectional view taken along the line 4—4 of the anode shown in Fig. 3.
Figure 3:
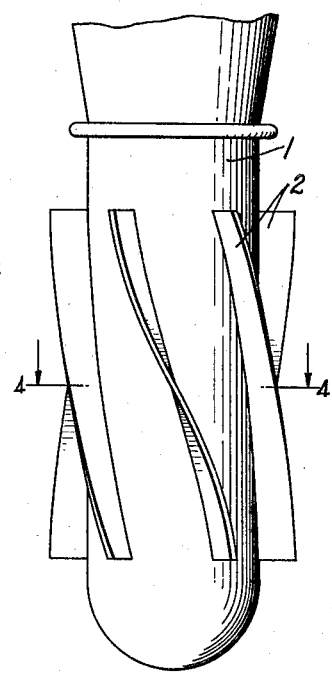
Fig. 3 is a partial elevational view, of a water-cooled vacuum tube provided with a modified anode in accordance with this invention.

The anode shown in Figs. 3 and 4 is a modification of the example shown in Figs. 1 and 2, in which the radial blades 2 are fixed to the periphery of the anode 1 obliquely, instead of vertically.

When the anode of such construction is cooled by cooling water, the cooling surface of the anode is made large and the circulation of water is facilitated, so that the cooling efficiency of the anode is promoted.

What is claimed is:

An electron discharge device comprising an envelope enclosing a plurality of electrodes and including a cup-shaped metallic portion constituting an anode for the device, a cylindrical glass portion closing the end of said metallic portion, and a plurality of vanes affixed to said metallic portion at an angle to the longitudinal axis thereof, said vanes extending lengthwise of said metallic portion and being in spaced relation with one another and positioned so that a cooling liquid may pass freely between them and over the outer surface of said metallic portion.

In witness whereof, I hereunto subscribe my name this twenty-fifth day of November, 1929.

RINJIRO SHIMIZU.